INVENTOR
JOHN J. GREVICH
BY
Williamson & Palmatier
ATTORNEYS

Nov. 8, 1966  J. J. GREVICH  3,284,269
SEALING APPARATUS
Filed June 20, 1963  4 Sheets-Sheet 2
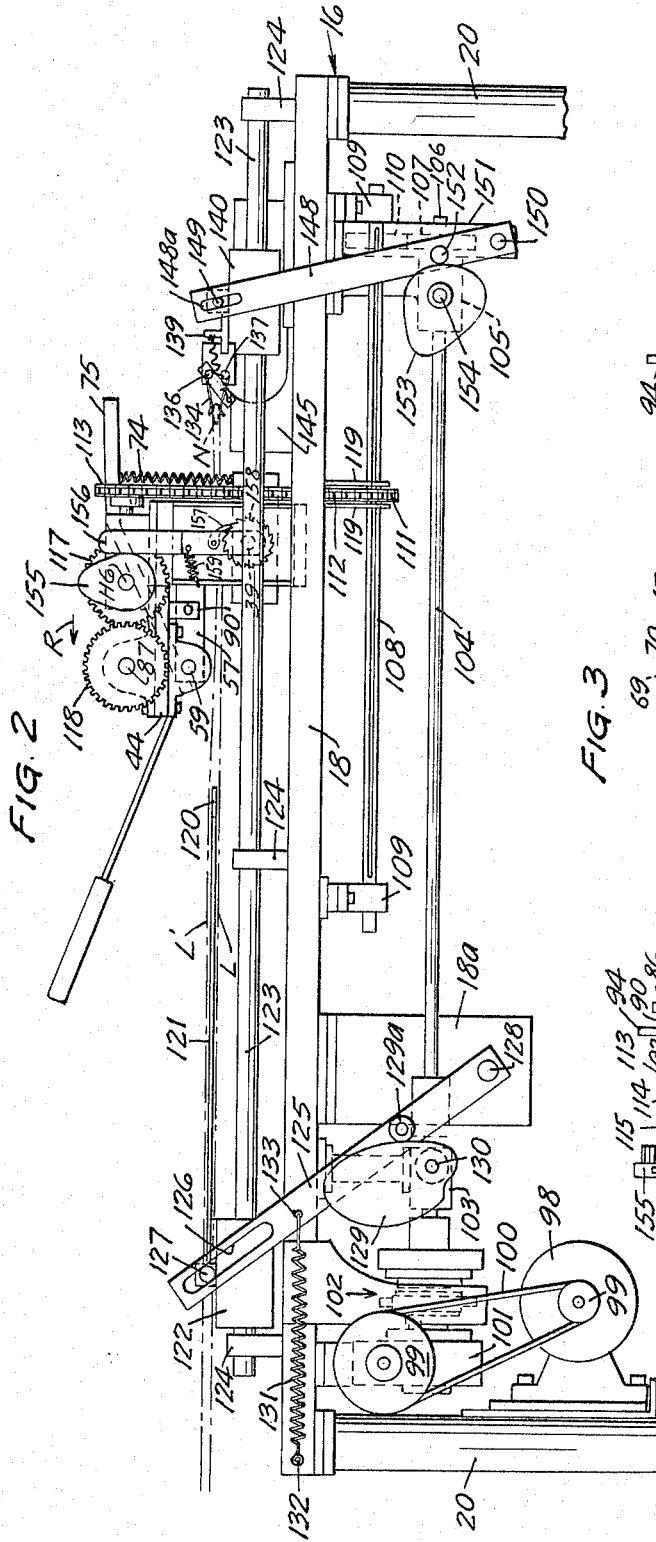
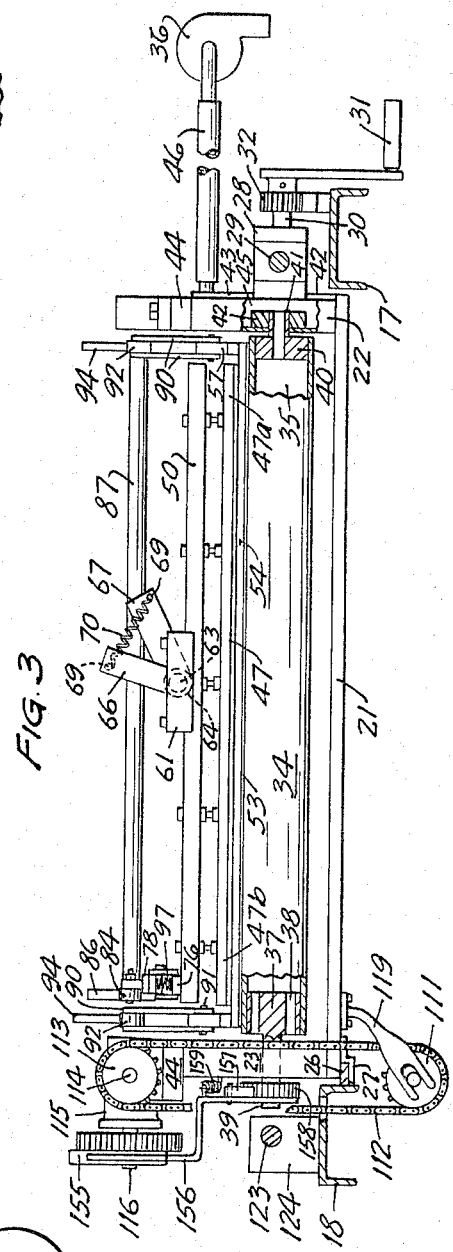
INVENTOR
JOHN J. GREVICH
BY Williamson & Palmatier
ATTORNEYS

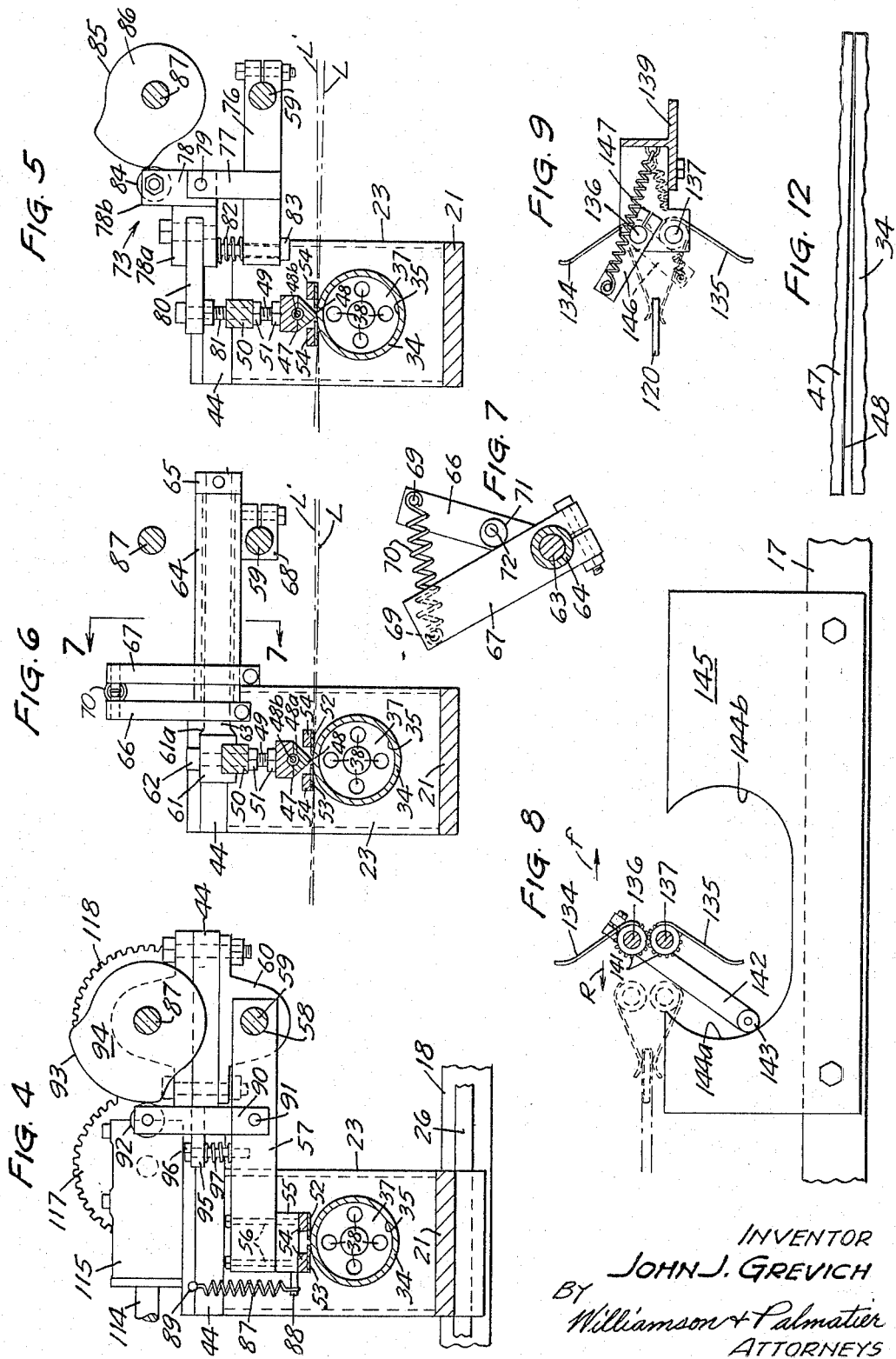

Nov. 8, 1966 J. J. GREVICH 3,284,269
SEALING APPARATUS
Filed June 20, 1963 4 Sheets-Sheet 4
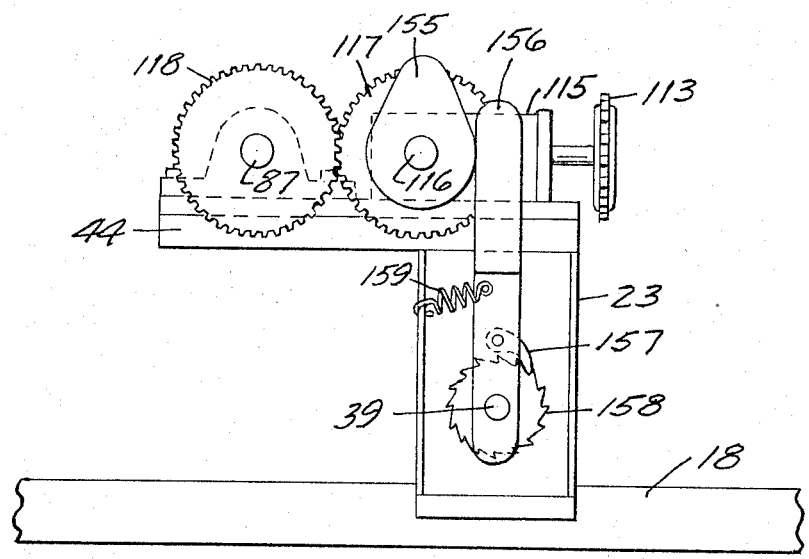
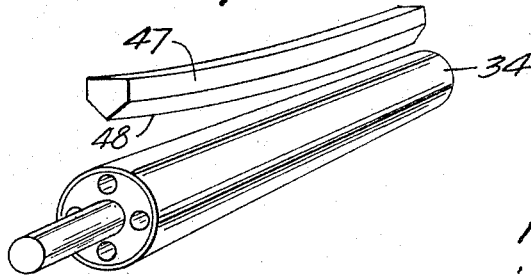
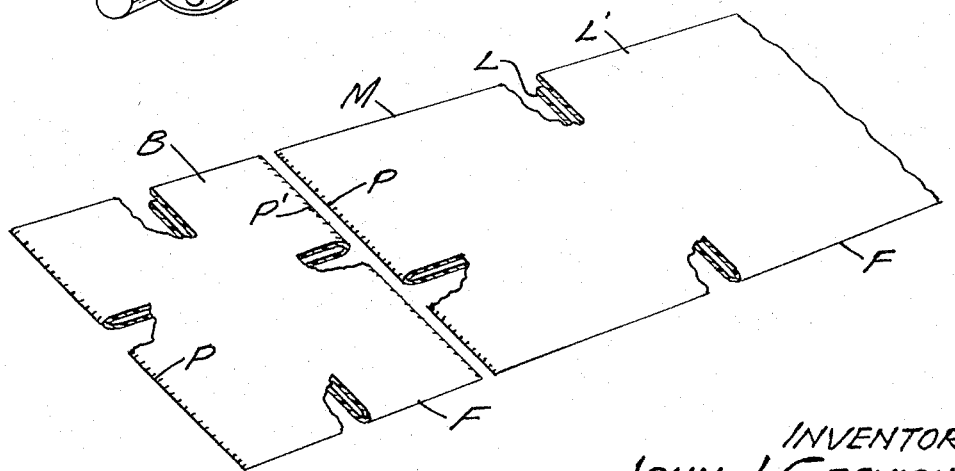
INVENTOR
JOHN J. GREVICH
BY Williamson & Palmatier
ATTORNEYS

United States Patent Office 3,284,269
Patented Nov. 8, 1966

3,284,269
SEALING APPARATUS
John J. Grevich, Star Prairie, Wis., assignor to Doughboy Industries, Inc., New Richmond, Wis., a corporation of Wisconsin
Filed June 20, 1963, Ser. No. 289,354
10 Claims. (Cl. 156—498)

This invention relates to apparatus for heat sealing and severing film materials of various types.

In the production of certain types of bags and packages from plastic film, it has been common practice in the past to orient a pair of film laminae in confronting and engaged relation with each other and then move a hot bar against the films to sever both laminae and to seal the laminae together at both sides of the severance line.

In accomplishing this severing or cutting and sealing, however, substantial difficulty has been encountered in producing a uniform severing and sealing so that the sealed edges of the superposed laminae are smooth and even and are uniformly sealed together all along the length thereof.

In the past such severing and sealing has been accomplished by suspending the laminae and then merely passing a hot bar through the laminae; however, uniformity of severing and sealing by this method leaves much to be desired due to the movement of the laminae as the bar passes through it. Attempts have been made to press a hot bar or knife against the laminae and against a support opposite the bar, but as a result of warpage of the bar due to heat applied to it, the severing and sealing of the laminae is without the uniformity desired in a quality product.

With these comments in mind it is to the elimination of these and other disadvantages that the present invention is directed, along with the inclusion therein of other and new and novel features.

An object of my invention is to provide a new and improved apparatus of simple and inexpensive construction and operation for severing a pair of superposed film laminae and sealing the edges of the laminae together along the line of severance.

Another object of my invention is to provide a novel apparatus for readily and easily severing a laminar film in such a manner as to produce uniformly smooth edges along the line of severance.

Still another object of my invention is to provide an improved and novel apparatus for producing a strong, uniform and continuous seal between a pair of superposed heat sealable laminae.

A further object of my invention is to provide an improved apparatus for producing bags of varying width from a substantially continuous strip of heat sealable film.

These and other objects and advantages of my invention will more fully appear from the following description made in connection with the accompanying drawings wherein like reference characters refer to the same or similar parts throughout the several views and in which:

FIG. 2 is a side elevation view of the invention with portions of the framework broken away;

FIG. 3 is a transverse sectional view taken approximately at 3—3 in FIG. 1;

FIG. 4 is a detail section view taken at approximately 4—4 in FIG. 1;

FIG. 5 is a detail section view taken at approximately 5—5 in FIG. 1;

FIG. 6 is a detail section view taken approximately at 6—6 in FIG. 1;

FIG. 7 is a detail section view taken at approximately 7—7 in FIG. 6;

FIG. 8 is a detail section view taken approximately 8—8 in FIG. 1;

FIG. 9 is a detail section view taken approximately 9—9 in FIG. 1;

FIG. 10 is detail elevation view taken approximately at 10—10 in FIG. 1;

FIG. 11 is a diagrammatic perspective view of certain parts of the apparatus shown somewhat distorted to emphasize their relationship;

FIG. 12 is a detail elevation view of the parts illustrated in FIG. 11 and shown without the distortion to illustrate their actual relationship; and FIG. 13 is a somewhat diagrammatic perspective view showing the film laminae as supplied and as formed into an open-ended bag, and with certain portions broken away for clarity of detail.

Figure 1:
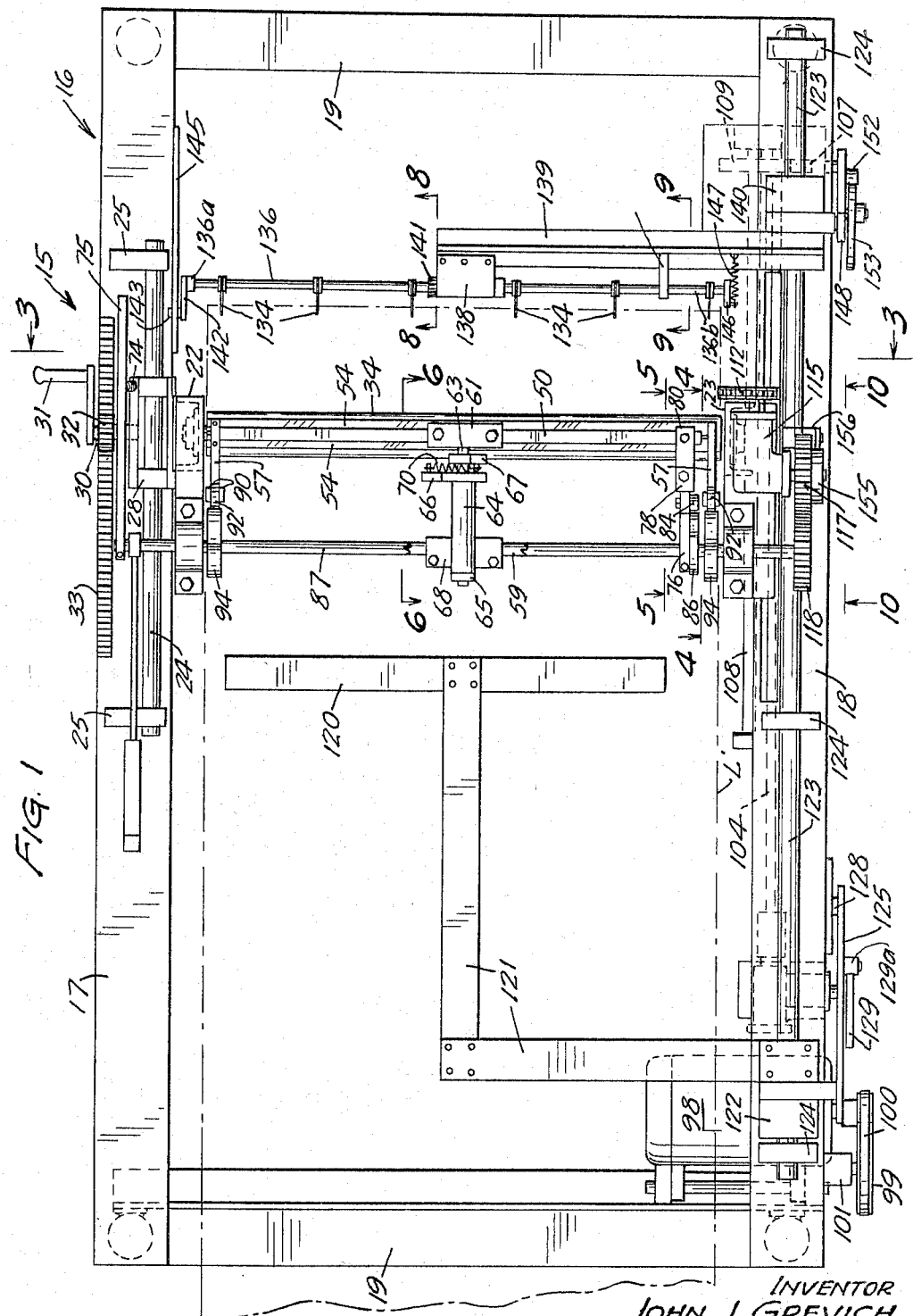
FIG. 1 is a top plan view of the invention.

One form of the present invention is shown in the drawings and is described herein. The bag-forming machine is indicated in general by numeral 15 and includes a frame indicated in general by numeral 16 and including a pair of rigid side frame members 17 and 18, end members 19 and support legs 20.

The frame also includes a cross head 21 having upright rigid end members 22 and 23. The cross head 21 is movable longitudinally of the side frame members 17 and 18 and is guided therealong by a rigid guide bar 24 which is affixed to upright mounting ears 25 which are affixed as by welding to the frame members 17. The other end of cross head 21 is supported upon an elongate bar 26 which is affixed as by welding to the frame member 18. The cross head 21 is retained on the bar 26 by a clip or bracket 27 which underlies the bar 26 and is slidable therealong, the clip being affixed to the cross head 21. The upright end member 22 of the cross head has a bearing block 28 affixed thereto, and the bearing block has a bearing aperture 29 therein slidably receiving the rod 24.

The head 21 is provided with means for moving the head longitudinally of the frame members 17 and 18 and in the form shown, such means comprise a stub shaft 30 journalled in the bearing block 28 and having a crank handle 31 affixed thereon and also having a pinion gear 32 affixed thereon to be rotated by the crank handle 31. The pinion gear 32 is meshed with a linear rack 33 which is affixed on the frame member 17 so as to produce fore-and-aft movement of the head 21 along the frame when the crank handle 31 is revolved.

The head 21 has a heat-conductive cylindrical roller 34 which has a hollow and open interior 35 through which cooling air is continuously drawn by means of a fan 36 for maintaining the peripheral surface of the roller in cool condition. The roller 34 has an end member 37 affixed in one end thereof and provided with air inlet apertures 38 for defining a stub shaft 39 journalled in a suitable bearing affixed on the upright member 23. The other end of roller 34 is provided with a rigid end member 40 defining a hollow stub shaft 41 journalled in bearing 42 which is affixed on the upright end member 22 of the cross head. It will be noted that the end member 22 is channel-shaped and oriented in an upright position. The open side of the channel-shaped end member 22 is provided with cover plates 42 and 43 which cooperate with the mounting block 28 in closing the outer side of the channel-shaped end member 22. The cross head member 21 underlies the lower end of end member 22 and an upper horizontally extending mounting plate 44 overlies the upper end of the channel-shaped end member 22 so as to substantially completely close the interior chamber 45 of the end member 22 which is in fluid communication with the interior 35 of the roller 34. The fan 36 is connected to the interior chamber 45 by an air conduit or hose 46 for continuously drawing cooling air through the roller 34.

The head also carries an elongate heated bar 47 extending substantially parallel with the roller 34 and having a lower edge 48 for engagement with the periphery of the roller 34. The bar 47 has an opening 48a extending entirely longitudinally therethrough for confining an electric resistance heating element 48b which maintains the entire bar 47 and particularly the edge 48 in heated condition at such a temperature as to produce severing of the laminae and sealing of the edges produced in the severance when the edge 48 engages the laminae. The bar 47 is supported by a plurality of threaded studs 49 on an elongate and rigid frame element or mounting bar 50 and the threaded studs are each provided with lock nuts 51 to maintain the studs in predetermined adjustment. The studs 49 are adjusted so as to longitudinally and convexly bow the bar 47 and edge 48 thereof, as illustrated in FIG. 11 to a small degree, substantially as seen in FIG. 12 so that only one point of edge 48 will engage the outer periphery of roller 34 at any one time, and so that when a longitudinal rocking of the heated severing bar 47 is induced, the edge 48 will rock along the length of roller 34 and progressively move the point of engagement between the edge and roller in a direction longitudinally of the roller. It will be seen that the superposed film laminae L and L' are supported on the periphery of the roller 34 beneath the edge 48 so that the heated bar 47 also progressively engages and applies heat across the laminae as the heated bar 47 is rocked, as hereinafter more fully described.

Means are provided for pressing and clamping the superposed heat-sealable film laminae down against the roller periphery, and in the form shown, such means include a pair of relatively thin and elongate hold-down plates 52 and 53 which are disposed in spaced edge-to-edge relation, and are disposed on opposite fore-and-aft sides of the heated bar edge 48 so as to permit the plates 52 and 53 to maintain the film laminae in clamped condition against the roller 34 while the heated bar 47 is rocked along the roller 34 and across the film laminae to produce the desired severing of the film laminae and sealing of the superposed edges of the laminae produced in the severance. The inner edges of the plates 52 and 53 extend inwardly in cantilever fashion so as to be permitted to flex slightly so as to engage the film laminae all across the width thereof. The outer edges of the plates 52 and 53 are affixed to rigid support bars 54 which are affixed at their opposite ends to spacer blocks 55 which are secured as by machine screws 56 to mounting bars 57. The mounting bars 57 have bearing apertures 58 receiving shaft 59 therethrough so as to permit relative swinging oscillation of the bars 57 with respect to the shaft 59.

The shaft 59 is mounted at opposite ends in bearings 60 which are affixed on the rigid mounting plates 44 which overlie and are affixed to the upper ends of the end members 22 and 23 respectively so as to permit at least limited rotary oscillation of the shaft 59.

Means are provided for mounting the rigid bar 50 for upward and downward movement toward and away from the roller 34 and also for rocking movement to facilitate rocking of the edge 48 longitudinally along the roller periphery, and in the form shown, such means include a recessed mounting block 61 receiving and holding the bar 50 and affixed thereto as by screws 62. The block 61 is affixed as by welding 61a to a mounting shaft 63 which extends through and is rotatably mounted in a tubular bearing sleeve 64. The shaft 63 has a collar 65 affixed on the rear end thereof and has a limit bar 66 clamped adjacent the forward end thereof and bearing rearwardly against the forward end of bearing sleeve 64. The bearing sleeve 64 also has a limit bar 67 affixedly clamped thereon adjacent bar 66. The bearing sleeve 64 has a shaft-clamping bracket 68 thereon which is affixedly clamped to the shaft 59 to turn therewith.

The limit bars 66 and 67 have pins 69 thereon between which extend a tension spring 70 as seen in FIG. 7, continuously urging the limit bars together and tending to rock the end portion 47a of heated bar 47 downwardly and tending to rock the end portion 47b upwardly. An adjustable stop element 71, in the form of an eccentric cam affixed to the limit bar 66 by a screw 72, engages the limit bar 67 to limit the downward rocking oscillation of the end portion 47a of the heated bar. Normally the stop 71 is adjusted so that under the influence of spring 70, the end portion 47a of heated bar 47 is disposed closest to the roller periphery.

Means are provided for moving the entire heated bar 47 upwardly and downwardly to cause the edge 48 to be spaced from or engaged with the periphery of the roller 34, and in the form shown such means include a cam-operated drive mechanism indicated in general by numeral 73, and a return spring 74. The spring 74 is a compression spring and has its lower end bearing downwardly against and secured to the head mounting slide block 28 and having its upper end engaging and bearing upwardly against a lever 75 affixedly connected to the rocker shaft 59 so as to urge the arm 75 upwardly and cause rocking of the shaft 59 to lift the entire heated bar 47 to spaced relation with the roller 34.

The cam-operated drive mechanism 73 includes a rocker arm 76 affixedly clamped on the rocker shaft 59 and having a pair of upstanding rigid mounting ears 77 upon which a bell crank arm 78 is pivoted as by a pivot bolt 79. The forwardly extending bifurcated end portion 78a of the bell crank arm carries plate 80 which carries a threaded and vertically adjustable abutment 81 which bears downwardly against the corresponding end portion of the rigid mounting bar 50. A compression spring 82 bears upwardly against the forward bifurcated end portion 78a of the bell crank arm 78 and bears downwardly against the end of rocker arm 76. Upward movement of the forward portion 78a is limited by a smooth-shanked retaining bolt 83 which extends slidably through the rocker arm 76 and is threaded into the forward bifurcated portion 78a of the bell crank arm 78.

The upper end portion 78b of the bell crank arm carries a cam-following roller 84 which bears against the peripheral camming surface 85 of a rotary cam 86 which is affixed on a rotary drive shaft 87. The roller 84 is maintained in engagement with the cam 86 through operation of spring 74 which normally causes rocker arm 76 to be urged in an upward direction.

Means are also provided for producing upward and downward movement of the spring clamping plates 52 and 53 and of the mounting arm 57 therefor. A tension spring 87 is secured at its lower end to a projecting pin 88 affixed on the spacer block 55, and the spring 87 is secured at its upper end to a pin 89 on the mounting plate 44, so as to normally urge the plates 52 and 53 and arms 57 in an upward direction.

The arms 57 at opposite ends of the bars 54 have cam roller-mounting links 90 pivotally connected thereto by pivots 91. The links 90 have cam following rollers 92 journalled on the upper ends thereof and bearing against the peripheral cam surfaces 93 of cams 94 which are affixed on the drive shaft 87. The links 90 have forwardly projecting plates 95 thereon slidably receiving stop screws 96 which are threadably secured in the arms 57. Springs 97 encompass the stop bolts 96 and bear upwardly against abutment projections 95 and bear downwardly against the arms 57 so as to transmit downward force against the arms 57 when the lobe on the cam surfaces 93 engages the cam following rollers 92.

The drive shaft 87 is continuously driven at a predetermined rate of rotation from a source of rotary power or motor 98 which transmits rotary power through pulleys 99 and belt 100 to a gear box 101. The drive output from the gear box 101 is transmitted through a clutch mechanism 102 and through a second gear box 103 to an elongate drive shaft 104 which extends below the frame member 18. On the forward end of shaft 104 a gear box 105 is provided and the output drive shaft 106 extending endwise through the gear box 105 has a pinion gear 107 keyed thereon. A countershaft 108 is journalled in bearings 109 on the frame member 18 and has a pinion gear 110 keyed thereon which is meshed with pinion gear 107 for imparting rotary movement to the countershaft 108. The countershaft 108 is splined along its entire length and has a sprocket 111 slidably mounted thereon. The sprocket 111 is connected by a roller chain 112 to sprocket 113 on the input drive shaft 114 to gear box 115. The gear box output drive shaft 116 which is in right angular relation with the input drive shaft 114, has pinion gear 117 affixed thereon and meshed with a pinion gear 118 which is affixed on the drive shaft 87. In order to cause free and easy sliding of the sprocket 111 along the splined countershaft 108, a pair of forks 119 are affixed on the cross head 21 and disposed on opposite sides of the sprocket 111 for urging the same slidably along the splined shaft 108 as the cross head 21 is moved longitudinally along the frame members 17 and 18.

Regarding the superposed heat-sealable film laminae L and L', being supplied to the machine, it will be seen in FIG. 13 that the laminae L and L' actually comprise opposite side portions of a single elongate and substantially continuous strip of heat-sealable film material M which is longitudinally folded midway between its edges as at F so that both edges of the strip of material M are adjacent each other in superposed relation. It will be seen in FIG. 13 that as the strip of material M is fed into the machine, the leading edge portion P has the superposed edges of the laminae L and L' already sealed together. As previously suggested, this sealed relation, between the superposed edges produced in a severance, is produced by the engagement of the heated bar 47 with the strip of material M, whereupon an open-ended bag B of heat-sealable film material has previously been formed by sealing along the portions P and P', and the bottom of the bag having been formed by the folded portion F.

The sealed leading edge portion P of the strip of heat-sealable film material M is used in connection with the means for synchronizing advancing the strip of material M through the machine for forming the bags B; and such means includes an elongate rigid and relatively thin pusher bar or plate 120 extending transversely across the frame and lying in a plane disposed slightly above the upper periphery of the roller 34. The pusher plate 120 is mounted on a thin and horizontal right angular frame member 121 which is affixed as by screws to a slide block 122. The slide block 122 is slidably mounted on a rigid guide rod 123 which is affixed in spaced relation above the frame member 18 by means of a plurality of rigid mounting ears or pedestals 124 and which extends along substantially the entire length of frame 18 for purposes which will be explained hereinafter. In FIG. 1 the pusher plate 120 is shown in its rearmost or rest position. Means are provided for slidably reciprocating the pusher plate 120 through a predetermined length of stroke from the position shown in FIG. 1 to the dotted line position N seen in FIG. 2. In the forward movement of the pusher plate 120, the plate 120 will move forwardly between the laminae L and L' and into engagement with the sealed portion P thereof, and will move over the roller 34 and beneath the heated bar 47 and also beneath the hold-down plates 53 and 52 which will have been elevated by the mechanism previously described. This movement of the pusher plate 120 forwardly of the bar 47 and roller 34 will supply a new length of the superposed laminae forwardly of the bar in connection with the formation of another bag B. The means for producing reciprocation of the pusher plate 120 and slide block 102 includes a swingable slide driving arm 125 which has an elongate slot 126 at its upper end slidably receiving a drive pin 127 affixed to the slide block 122. The lower end of arm 125 is swingably mounted on a pivot shaft 128 which is secured on a depending frame element 18a suspended from the frame member 18. A cam 129 is affixed on the right angular drive shaft 130 of the gear box 103 and the peripheral cam surface of the cam 129 engages a cam follower 129a, the side of the arm 125 producing the swinging oscillation of the arm. An elongated tension spring 131 continuously urges the arm 125 rearwardly against the peripheral surface of cam 129 and it will be seen that the rear end of spring 131 is secured to a pin 132 on the frame member 18, and the forward end of spring 131 is affixed to a pin 133 on the arm 125.

Means are provided for receiving, gripping and retaining the forward portion P of the strip of heat-sealable material M delivered to the dotted position N at the forward end of the pusher element stroke so as to assure that there will be no rearward movement of the strip M as the pusher element commences moving in a rearward direction from its foremost position, and so as to also provide for controlled release of the bag which is formed and permit orderly stacking of the formed bags. In the form shown, such means include a plurality of upper and lower swingable and resilient film-gripping fingers 134 and 135 which are respectively affixed on rocker shafts 136 and 137. Shafts 136 and 137 are journalled in a bearing block 138 which is affixed to an elongate frame member 139 carried by a slide block 140 which is slidably mounted on the forward end of stationary guide rod 123. The shafts 136 and 137 have intermeshed sprockets 141 affixed thereon so as to coordinate rocking motion of said shafts and of the gripper fingers 134 and 135. The end portion 136a of shaft 136 extends endwise beyond the corresponding end portion of shaft 137 and has a lever arm 142 affixedly clamped thereon and mounting a cam-following roller 143 which engages and is moved by the camming edges 144a and 144b of a cam plate 145 which is affixedly secured to the frame member 17 in upright position. The roller 143 will engage opposite end portions of the camming edges 144a and 144b as the shafts 136 and 137 and slide block 140 are moved forwardly and rearwardly along the slide rod 123. As depicted in FIG. 8, when the shafts 136 and 137 move rearwardly in the direction of arrow R, the roller 143 engages the camming edge 144a and causes counterclockwise swinging of the shaft 136 which produces opposite swinging of the shaft 137, thus causing closing of the spring fingers into the dotted position shown in FIG. 8. The fingers then remain in closed condition until the roller 143 has moved forwardly in the direction of arrow f into engagement with the camming edge 144b whereupon the fingers will be opened and the bag B which has been produced will be released.

The end portion 136b of shaft 136 has a lever arm 146 thereon, to the end of which is secured a tension spring 147, the other end of which is secured to the frame element 139. It will be seen in FIG. 9 that as shaft 136 is rocked from one position to another, the spring 147 is shifted to opposite over-center positions, whereupon the spring holds the shafts in the rocked position.

The means for slidably reciprocating the gripping fingers and slide block 140 includes a swing arm 148 having a slot 148a in its upper end slidably receiving a pin 149 which is affixed on the slide block 140. The lower end of swing arm 148 is swingably mounted on a pivot shaft 150 which is affixed on a rigid frame element 151 which depends from the frame member 18. Swing arm 148 has a cam-following roller 152 thereon which engages the peripheral camming surface of a rotary cam 153 which is affixed on the right angular output drive shaft 154 of gear box 105. It will therefore be seen that as the cam is revolved through a complete cycle of rotation, a complete cycle of reciprocation of slide block 140 and the gripper fingers will have been accomplished.

Means are provided for indexing or arcuately revolving the roller 34 through a predetermined angle through each cycle of operation and in the form shown, such means include a rotary cam 155 affixed on the gear box output shaft 116 and oriented with the peripheral camming portion engaging the side of a swingably oscillatable arm 156 which is swingably mounted on the shaft 39 so as to be permitted to turn relative to the shaft. The arm 156 has a pawl 157 pivotally mounted thereon and engaging the teeth of a ratchet wheel 158 which is affixed on the end shaft 39 of the roller 34 so as to produce incremental rotation of the roller 34 when the pawl 157 urges the ratchet wheel through an increment of arcuate movement. A return spring 159 is connected between the upright end member 23 and the arm 156 to maintain the arm against the peripheral cam surface.

It should be understood that all of the several gear boxes delivering rotary power right angularly off the main drive shaft 104 and into the drive shaft 87 have one to one gear ratios so as to produce equal rotational speeds of all the drive shafts and cams.

If it is assumed that a bag B has just been finished in a previous cycle of operation, the heated bar 47 and the clamping plates 52 and 53 will have been raised above the cooling roller 34 so as to release the trailing edge portion P' of the bag B. The cam 153 will cause forward movement of the slide block 140 and gripper fingers 134 and 135 until the roller 143 engages the forward camming edge 144b whereupon the fingers 134 and 135 are opened to the full line position shown in FIG. 9 so as to release the bag B and allow the bag B to fall neatly onto an orderly stack of bags. As the bag B is being withdrawn from the area of roller 34, the cam 129 will have started moving the pusher plate 120 forwardly and into engagement with the sealed portion P of the heat-sealable strip M so as to move an additional length of the strip forwardly of the heated bar. It will be understood that in each cycle of operation the length of stroke of the pusher element 120 remains constant, and depending upon the previous set position of the cross head 21, the pusher plate may engage the portion P of the film strip M adjacent the forward portion of the stroke or adjacent and rearward limit of the stroke. In the position of the cross head shown in FIG. 2, the pusher plate 120 will engage the portion P of the strip M adjacent the forward end of its reciprocating stroke and will therefore pull only a small portion of the strip M forwardly. As a result, the bags are of relatively narrow width. However, by turning the crank 31 so as to move the cross head rearwardly in the direction R along the frame members 17 and 18, the width of the bag B produced in a cycle of operation will be increased. It will be seen that it is an extremely simple matter in this novel bag-forming machine to vary the size of bag produced by a simple adjustment.

As the pusher element 120 reaches its forward limit of movement, the fingers 134 and 135 will have again returned rearwardly in the direction of arrow R to substantially their limit of rearward movement and will close upon the pusher element and the film laminae L and L'. The gripper fingers will retain the film laminae as the pusher element commences to move rearwardly.

The cams 86 and 94 are adjusted such that as soon as the pusher element 120 has cleared the roller 34 and bar 47, the cams 94 will urge the mounting bars 57 and the laminae-clamping plate 52 and 53 downwardly into clamping engagement with the film laminae as depicted in FIG. 6. As soon as the film laminae have been clamped, cam 86 will operate against roller 84 so as to swing the lever arm 76 slightly downwardly, whereupon to rock the shaft 59, causing the bearing sleeve 64 and shaft 63 to move the mounting rod 50 downwardly until the edge 48 at the end portion 47a of the heated bar engages the superposed film laminae for applying heat thereto. As soon as the downward movement of end portion 47a is stopped by the roller 34, downward pressure is applied against the other end 47b of the bar through the corresponding end portions of the mounting bar 50, through action of the bell crank arm 78. Thus rocking of the longitudinally and convexly bowed heated bar 47 is commenced in a direction longitudinally along the roller 34 and transversely across the superposed film laminae maintained in clamped relation against the roller 34 by the spring plates 52 and 53. As the rocking motion of the longitudinally and convexly bowed heated bar 47 progresses, the point of engagement between the heated bar and the film laminae and roller 34 will progressively move longitudinally along the edge 48 and longitudinally along the roller 34. Through this rocking motion, the severance of the laminae L and L' is extremely neatly accomplished with no puckering of the film or other deformation thereof. It will be understood that because the roller 34 is continuously cooled by the fluid coolant traveling therethrough, the severed edges of the laminae L and L' are immediately cooled by the roller, as these severed edges are maintained in engagement with the roller by the plates 52 and 53. The superposed edges produced by the severance are immediately sealed together to produce sealed portions P and P' as illustrated in FIG. 13.

As the rocking motion of the heated bar 47 progresses, the limit bar 66 is swung away from the bar 67. When the lobe of cam 86 passes beyond the following roller 84, the heated bar 47 immediately swings upwardly away from the roller 34 and also rocks back to the normal rest position wherein the end portion 47a of the heated bar is most closely spaced to the roller 34. As soon as the heated bar is released and moved upwardly under the influence of spring 74, the lobe of cam 94 releases the downward pressure on plates 52 and 53 to permit upward return thereof under the influence of spring 87, whereupon the bag B is released to permit withdrawal thereof by means of the spring fingers 134 and 135 as previously described, and to also permit forward movement of the pusher plate 120 over the roller 34 as previously described, so as to bring another portion of the strip M onto the roller 34.

It will further be noted that as the heated bar 47 has been moved upwardly and the spring plates 52 and 53 have been moved upwardly out of engagement with the roller 34, the cam 155 swings the drive arm 156 to cause pawl 157 to urge the ratchet wheel 158 and roller 34 to a slightly shifted position as to reindex the roller 34 and assure that the portion of the surface thereof subsequently engaged by the heated bar 37 is sufficiently cool as to provide adequate cooling of the edges of the film laminae produced in the severance. As the lobe of cam 155 turns past the arm 156, the spring 159 returns the arm 156 to vertical position and retracts the pawl 157 to the rest notch of the ratchet wheel 158.

It will, of course, be understood that various changes may be made in the form, details, arrangement and proportions of the parts without departing from the scope of the invention which consists of the matter shown and described herein and set forth in the appended claims.

What I claim is:

1. Apparatus for severing a pair of superposed film laminae and sealing together the laminae edges produced in the severance,
   comprising a frame,
   an elongate roller having heat-conductive means defining an outer roller surface against which the superposed laminae lie,
   a heated film-severing and sealing element having an elongate and convexly bowed edge extending longitudinally of the roller and in confronting relation with the outer surface thereof and bearing against the laminae and roller at one point along said edge,
   means mounting said severing and sealing element for rocking the bowed edge longitudinally along the roller,
   and means producing rocking of said element along the roller to progressively move said point longitudinally along the roller and progressively produce severance of the superposed laminae and sealing of the superposed edges produced in the severance.

2. Apparatus for severing a pair of superposed film laminae and sealing together the laminae edges produced in the severance,
comprising a frame,
a pair of elongate rigid heat-conductive film-treating members in juxtaposed relation with each other, each of said members having an elongate engagement portion extending longitudinally thereof, the engagement portion of one of said members being longitudinally and convexly bowed and in engagement at one point with the engagement portion of the other of said members,
one of said members consisting in a heated bar and the engagement portion of said bar comprising an edge, the other of said members consisting in an elongate cooled roller and the engagement portion thereof comprising the peripheral roller surface thereof upon which the superposed film laminae lie,
means mounting said members on the frame for relative rocking movement longitudinally of said members,
means on the frame producing relative rocking movement of said members with respect to each other to progressively move the point of engagement between said members in a direction longitudinally along said members and thereby progressively produce severance of the superposed laminae and sealing of the superposed edges produced in the severance,
and means revolving said roller whereby to change the peripheral surface portion in engagement with the bar to cause the roller to maintain the cooling effect upon the severed and sealed edges of the laminae.

3. Apparatus for severing a pair of superposed film laminae and sealing together the laminae edges produced in the severance,
comprising a frame,
a pair of elongate rigid heat-conductive film-treating members in juxtaposed relation with each other, each of said members having an elongate engagement portion extending longitudinally thereof,
the engagement portion of one of said members being longitudinally and convexly bowed and in engagement at a point with the engagement portion of the other of said engagement members,
one of said members consisting in a heated bar and the engagement portion thereof comprising an edge, the engagement portion of the other of said members comprising a cooled laminae-supporting surface with a breadth substantially in excess of the width of said edge and supporting the film laminae on opposite sides of the point of engagement and on opposite sides of the edge to effect cooling of the laminae,
means on the frame mounting said members for relative rocking movement longitudinally along the members to facilitate progressive movement of the point of engagement between said members in a direction longitudinally along said members,
and means on the frame producing said relative rocking movement of said members to produce longitudinal movement of said point of engagement and produce progressive severance of the superposed laminae and sealing of the superposed edges produced in the severance,
and means maintaining the severed and sealed superposed edges of the laminae in engagement with said cooled surface to effect cooling of the laminae edges.

4. Apparatus for severing a pair of elongate superposed film laminae and sealing together the laminae edges produced in the severance,
comprising a frame along which the pair of film laminae extend,
a pair of elongate rigid heat-conductive film-treating members in juxtaposed and spaced relation with each other to receive the laminae therebetween, each of said members having an elongate engagement portion extending longitudinally thereof and extending transversely of the laminae and in confronting relation therewith, the engagement portion of one of said members being longitudinally and convexly bowed for engagement at one point with the engagement portion of the other of said members,
one of said members consisting in a heated bar and the engagement portion of said bar comprising an edge, the engagement portion of the other of said members comprising a cooled laminae-supporting surface area with a breadth substantially in excess of the width of said edge and supporting the film laminae on opposite sides of the edge to effect cooling of the laminae,
means on the frame mounting said members for relative movement toward and away from each other to permit engagement of said members at said point, and also mounting said members for relative rocking movement along the members to facilitate progressive movement of the point of engagement in a direction longitudinally along said members,
means on the frame producing relative movement of said members toward and into engagement with each other, and successively producing relative rocking movement of said members and thereby move the point of engagement of said members longitudinally therealong and produce progressive severance of the laminae therebetween and sealing of the superposed edges produced in the severance, and successively produce relative movement of said members away from each other,
a rigid and relatively thin elongate element extending transversely of the superposed laminae and therebetween for engaging a sealed edge of the superposed laminae and moving the laminae forwardly between said film-treating members,
means mounting said rigid element for fore-and-aft movement transversely of said elongate members and therebetween for moving another portion of the laminae into confronting relation with the film-treating members,
whereby in successive operations open-ended film bags are produced.

5. Apparatus for severing a pair of elongate superposed film laminae and sealing together the laminae edges produced in the severance,
comprising a frame along which the pair of film laminae extend,
a pair of elongate rigid heat-conductive film-treating members in juxtaposed and spaced relation with each other to receive the laminae therebetween, each of said members having an elongate engagement portion extending longitudinally thereof and extending transversely of the laminae and in confronting relation therewith, the engagement portion of one of said members being longitudinally and convexly bowed for engagement at one point with the engagement portion of the other of said members,
one of said members consisting in a heated bar and the engagement portion of said bar comprising an edge, the engagement portion of the other of said members comprising a cooled laminae supporting surface with a breadth substantially in excess of the width of said edge and supporting the film laminae on opposite sides of the edge to effect cooling of the laminae,
a pair of elongate film-clamping plates respectively disposed on opposite sides of said bar edge and in spaced and confronting relation with said supporting surface for movement toward the surface in film-clamping relation therewith,
means on the frame mounting said film-treating members for relative movement toward and away from each other to permit engagement of said members at said point, and said means also mounting said plates for releasable engagement with said supporting surface for clamping the film against the cooled surface, and said means also mounting said film-treating members for relative rocking movement along said engagement portions to facilitate progressive movement of the point of engagement in a direction longitudinally along said members, means on the frame producing a film-clamping relation between said plates and the supporting surface, and also producing relative movement of said film-treating members toward and into engagement with each other, and also successively producing relative rocking movement of said film-treating members and thereby move the point of engagement longitudinally therealong and effect progressive severance of the laminae therebetween and sealing of the superposed edges produced in the severance, and also successively producing relative movement of said film-treating members away from each other, means intermittently moving the elongate film laminae between the film-treating members, whereby in successive operations open-ended film bags are produced.

6. Apparatus for severing a pair of elongate superposed film laminae and sealing together the laminae edges produced in the severance, comprising a frame along which the elongate laminae extend, an elongate rigid heat-conductive laminae-supporting member on the frame and having means for cooling said member, a pair of juxtaposed film-laminae clamping plates rigidly affixed in spaced and substantially edge-to-edge relation with each other and in confronting relation with said member and being movably mounted on the frame for movement toward and away from said member to releasably clamp the film laminae thereagainst, means moving said plates toward and away from said member, an elongate rigid heat-conductive bar extending along said member in spaced relation therewith and spaced above said plates and having a longitudinally and convexly bowed edge confronting said member and aligned with the open space between said plates for movement therethrough to engage said member for engaging the film laminae supported on the member, said bar having means for heating said edge, means mounting said bar to permit rocking of said bar longitudinally along said edge in engagement with said member, and means producing movement of the bar into engagement with said member and rocking said bar along said edge in engagement with said member and progressively move the point of engagement longitudinally along the member and edge to effect severing of the elongate film laminae on the member and sealing together the laminae edges produced in the severance.

7. Apparatus for severing a pair of superposed film laminae and sealing together the edges produced in the severance, comprising a frame along which the elongate laminae extend, an elongate rigid heat-conductive laminae-supporting member on the frame and having means for cooling said member, an elongate rigid heat-conductive bar spaced along said member in spaced relation therewith and having a longitudinally and convexly bowed edge confronting said member for engaging said member and the film laminae supported thereon, means mounting said bar to permit rocking of the bar longitudinally along said edge in engagement with said member and means producing movement of the bar into engagement with said member and rocking the bar along said edge in engagement with said member to thereby progressively move the point of engagement longitudinally along the member to effect progressive severing of the film laminae on the member and sealing together the laminae edges produced in the severance.

8. Apparatus for severing a pair of elongate superposed film laminae and sealing together the laminae edges produced in the severance, comprising a frame along which the film laminae extend, a pair of elongate rigid heat-conductive film treating members in juxtaposed and spaced relation with each other to receive the film laminae therebetween, each of said members having an elongate engagement portion extending longitudinally thereof and extending transversely of the laminae and in confronting relation therewith, the engagement portion of one of said members being longitudinally and convexly bowed for engagement at one point with the engagement portion of the other of said members, one of said members consisting in a heated bar and the engagement portion of said bar comprising an edge, the engagement portion of the other of said members comprising a cooled laminae-supporting surface with a breadth substantially in excess of the width of said edge for supporting the film laminae on opposite sides of the edge to effect cooling of the laminae, means on the frame mounting said members for relative movement toward and away from each other to permit engagement of said members at said point, and also mounting said members for relative rocking movement along the members to facilitate progressive movement of the point of engagement in a direction longitudinally along said members, means on the frame producing relative movement of said members toward and into engagement with each other, and successively producing relative rocking movement of said members and thereby move the point of engagement of said members longitudinally therealong and produce progressive severance of the laminae therebetween, and sealing of the superposed edges produced in the severance, and successively produce relative movement of said members away from each other, a rigid and relatively thin elongate element extending transversely of the superposed laminae and therebetween for engaging a sealed edge of the superposed laminae and moving the laminae forwardly between said film-treating members, means mounting said rigid element for fore-and-aft movement transversely between said elongate members for moving another portion of the laminae into confronting relation with the film-treating members, film-laminae gripping means on the frame for engaging and gripping the film laminae on the rigid element at the forwardmost limit of the movement thereof for retaining said film laminae while said rigid element moves rearwardly to clear said members whereby to retain a predetermined length of film laminae forwardly of said members to produce an open-ended bag of predetermined size.

9. Apparatus for severing a pair of elongate superposed film laminae and sealing together the laminae edges produced in the severance, comprising a frame along which the film laminae extend, said frame including a head, a pair of elongate rigid heat-conductive film-treating members in juxtaposed and spaced relation with each other to receive said laminae therebetween, said members respectively having a heated film-severing and sealing edge and a cooled laminae-supporting surface spaced from said edge, means mounting said members on the head for engagement with each other along the length of said edge,
means producing movement of said members into and out of engagement with each other to produce severance of the laminae therebetween and sealing of the superposed edges produced in the severance.
a rigid and relatively thin elongate pusher element extending transversely of the superposed laminae and disposed therebetween for engaging a sealed edge of the superposed laminae and moving the laminae forwardly between said film-treating members,
means mounting and producing forward and rearward reciprocating movement of said rigid member in a direction transversely between said film-treating members to move another portion of the laminae into confronting relation with said members,
a plurality of film laminae grippers releasably clamping said film laminae on said pusher element at the forwardmost limit of movement thereof to retain the laminae in a predetermined position while said pusher element moves rearwardly to clear said members to effect production of open-ended bags of a predetermined size.

10. The invention set forth in claim 9 and including means movably mounting said head on the frame for fore-and-aft movement and thereby facilitate moving of said members with respect to said film-gripping means and with respect to the fore-and-aft movements of said pusher element,
and means adjustably retaining said head in a desired position on the frame whereby to produce open-ended bags of desired size.

No references cited.

EARL M. BERGERT, *Primary Examiner.*

D. J. DRUMMOND, *Assistant Examiner.*